United States Patent
Golla et al.

(10) Patent No.: US 11,983,538 B2
(45) Date of Patent: May 14, 2024

(54) LOAD-STORE UNIT DUAL TAGS AND REPLAYS

(71) Applicant: Cadence Design Systems, Inc., San Jose, CA (US)

(72) Inventors: Robert T. Golla, Austin, TX (US); Ajay A. Ingle, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 44 days.

(21) Appl. No.: 17/659,569

(22) Filed: Apr. 18, 2022

(65) Prior Publication Data
US 2023/0333856 A1 Oct. 19, 2023

(51) Int. Cl.
*G06F 9/38* (2018.01)
*G06F 12/0855* (2016.01)

(52) U.S. Cl.
CPC ........ *G06F 9/3834* (2013.01); *G06F 12/0855* (2013.01)

(58) Field of Classification Search
None
See application file for complete search history.

(56) References Cited

U.S. PATENT DOCUMENTS

| | | | |
|---|---|---|---|
| 5,551,000 A | 8/1996 | Tan et al. | |
| 7,165,167 B2 | 1/2007 | Filippo et al. | |
| 7,962,730 B2 | 6/2011 | Lien et al. | |
| 8,316,188 B2* | 11/2012 | Kadambi | G06F 9/383 711/146 |
| 9,311,094 B2* | 4/2016 | Gonion | G06F 9/30018 |
| 9,946,547 B2 | 4/2018 | Yu et al. | |
| 10,970,077 B2 | 4/2021 | Kesiraju et al. | |
| 2003/0023814 A1* | 1/2003 | Barroso | G06F 12/0826 711/144 |
| 2003/0217115 A1* | 11/2003 | Rowlands | G06F 13/4027 709/214 |
| 2004/0255101 A1* | 12/2004 | Filippo | G06F 9/3842 712/225 |
| 2007/0271416 A1* | 11/2007 | Ahmed | G06F 12/126 711/E12.075 |
| 2008/0183972 A1* | 7/2008 | Dieffenderfer | G06F 12/0831 711/146 |
| 2009/0144519 A1* | 6/2009 | Codrescu | G06F 9/30101 711/207 |
| 2010/0262808 A1 | 10/2010 | Bose et al. | |
| 2010/0306475 A1* | 12/2010 | Hooker | G06F 9/30047 711/170 |

(Continued)

*Primary Examiner* — Shawn Doman
(74) *Attorney, Agent, or Firm* — Mark H. Whittenberger; Holland & Knight LLP (57) ABSTRACT

Techniques are disclosed relating to a processor load-store unit. In some embodiments, the load-store unit is configured to execute load/store instructions in parallel using first and second pipelines and first and second tag memory arrays. In tag write conflict situations, the load-store unit may arbitrate between the first and second pipelines to ensure the first and second tag memory array contents remain identical. In some embodiments, a data cache tag replay scheme is utilized. In some embodiments, executing load/store instructions in parallel with fills, probes, and store-updates, using separate but identical tag memory arrays, may advantageously improve performance.

12 Claims, 8 Drawing Sheets

(56) References Cited

U.S. PATENT DOCUMENTS

| | | | |
|---|---|---|---|
| 2011/0185125 A1* | 7/2011 | Jain | G06F 12/0811 |
| | | | 711/E12.024 |
| 2012/0079204 A1* | 3/2012 | Chachad | H03M 13/353 |
| | | | 711/147 |
| 2012/0221796 A1* | 8/2012 | Tran | G06F 9/3851 |
| | | | 711/131 |
| 2013/0212585 A1* | 8/2013 | Tran | G06F 9/30189 |
| | | | 718/102 |
| 2017/0351610 A1* | 12/2017 | Tran | G06F 12/084 |
| 2018/0307608 A1* | 10/2018 | Di | G06F 9/3802 |

\* cited by examiner

Perform, by a load-store unit, multiple types of memory access instructions executed by a processor, using first and second pipelines in parallel
710

Determine whether memory access instructions hit in cache circuitry, including:
- use a first tag memory array for the first pipeline; and
- use a second tag memory array for the second pipeline

720

Control the first and second tag memory arrays such that they store matching tag information
730

LOAD-STORE UNIT DUAL TAGS AND REPLAYS

BACKGROUND

Technical Field

This disclosure relates generally to processor performance and more particularly to load-store unit pipelines.

Description of the Related Art

The load-store unit in a computing system is important in various contexts. The load-store unit may be responsible for performing loads from and stores to one or more levels of a cache/memory hierarchy. These memory access instructions as well as handling pipeline and resource hazards may have a substantial impact on the performance of the processor. Handling these instructions in parallel may be desirable in some contexts.

Modern processors adopt speculative scheduling techniques to overcome control dependencies by predicting outcomes and speculatively executing instructions by assuming predictions were correct (e.g., based on predicted branch directions, predicting that a load will hit at a certain cache level, etc.). Speculatively executing instructions means that mispredictions, that may involve multiple levels of dependence chains, should be recovered in order to prevent incorrect execution. Various replay schemes may be implemented to mitigate such issues.

DETAILED DESCRIPTION

In disclosed embodiments discussed in detail below, a load-store unit is configured to execute various memory access instructions, etc. In various contexts, the ability to parallelize execution of the various operations in a load-store unit may advantageously increase performance. However, to enable parallel execution of operations within a load-store unit, multiple pipelines may be implemented. This may be challenging, e.g., when multiple pipelines are able to access a cache such that conflicts may occur when accessing cache tags.

For example, multiple parallel pipelines may access a tag array, in a given cycle, to write a tag entry. This conflict may cause incorrect execution results unless handled properly.

Therefore, in disclosed embodiments, multiple tag arrays may be implemented for different pipelines. Different pipelines may perform different (and in some embodiments, non-overlapping) subsets of load-store unit operations. Control circuitry may propagate changes from one tag array to one or more other tag arrays such that the tag arrays remain synchronized. Further, control circuitry may arbitrate among multiple pipelines and allow at most one pipeline to write to a tag array in a given cycle, in some embodiments. One or more instructions in a pipeline that loses arbitration for the tag array may be flushed and replayed. This may advantageously improve performance by parallelizing memory access operations with limited costs in terms of area and power consumption.

Overview of Dual Pipeline Dual Tag Array

Figure 1:
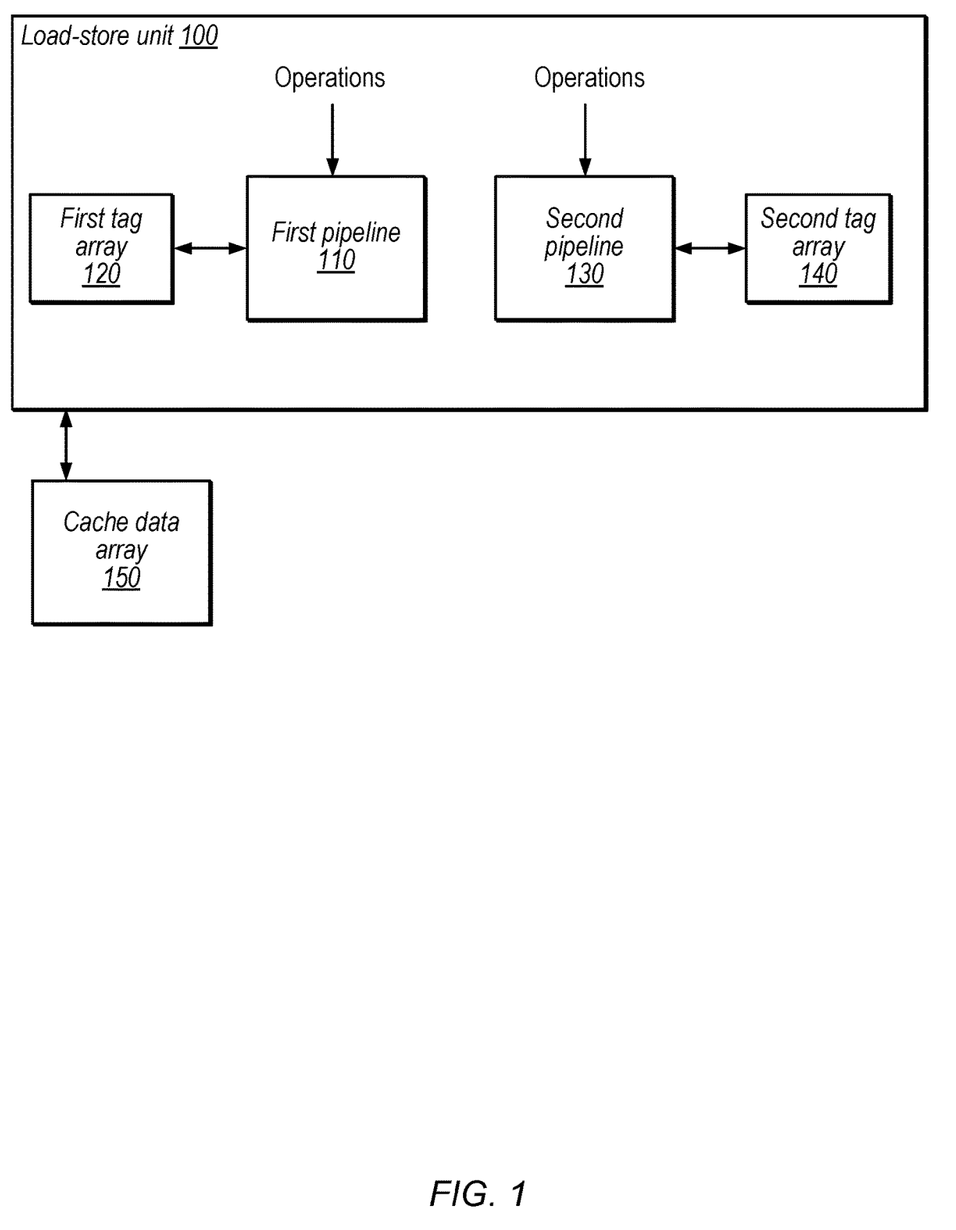
FIG. 1 is a generalized block diagram illustrating a dual pipeline load-store unit with a dual tag array, according to some embodiments.

FIG. 1 is a block diagram illustrating a load-store unit with two parallel pipelines and dual tag arrays, according to some embodiments. The illustrated embodiment includes a load-store unit 100 and a cache data array 150. Load-store unit 100, in turn, includes a first pipeline 110, a first tag array 120, a second pipeline 130, and a second tag array 140. In the illustrated embodiment, first tag array 120 is configured to be the tag memory array corresponding to first pipeline 110. Similarly, in the illustrated embodiment, second tag array 140 is configured to be the tag memory array corresponding to second pipeline 130.

First pipeline 110 may include multiple stages, including, without limitation, instruction decode, address generation, cache access, memory access, write back, etc. Detailed examples of pipeline stages are discussed below with reference to FIG. 2. Second pipeline 130 may include similar stages. In some embodiments, the first and second pipelines are configured to perform different subsets of operations performed by load-store unit 100. For example, first pipeline 110 may be configured to service load instructions, store instructions, atomic operations, etc., using first tag array 120 and second pipeline 130 may be configured to service fills, probes, store-updates, etc., using second tag array 140, in some embodiments.

In some embodiments, first tag array 120 and second tag array 140 store identical copies of the same information and remain consistent at all times. In some embodiments, first tag array 120 may be used for data cache instruction access while second tag array 140 may be used to service various other types of operations that are received from control circuitry for a higher level in a cache/memory hierarchy (e.g., an L2 cache) such as fills, store-updates, and probes, for example. In some embodiments, the two tag array contents may be read independently but only one tag write may occur each cycle, e.g., to ensure tag array contents remain identical.

In some embodiments, cache data array 150 is a data cache that includes data in multiple different sets and ways of the data cache that is referenced using tag information. In other embodiments, the cache may be direct mapped or fully associative. In some embodiments, cache data array 150 is a write-through data cache. In other embodiments, cache data array 150 may be a write-back data cache.

Note that in other embodiments, tag array write conflicts may be mitigated by utilizing dual tag arrays and control circuitry configured to arbitrate priority between multiple pipelines. Disclosed arbitration techniques may be performed via a single tag memory array that has dual read port and single write port capabilities.

As discussed in detail below with reference to FIG. 3, control circuitry may arbitrate among the first pipeline 110 and second pipeline 130 when both pipelines attempt to write to the tag arrays in a given cycle.

Example LSU Circuitry

Figure 2:
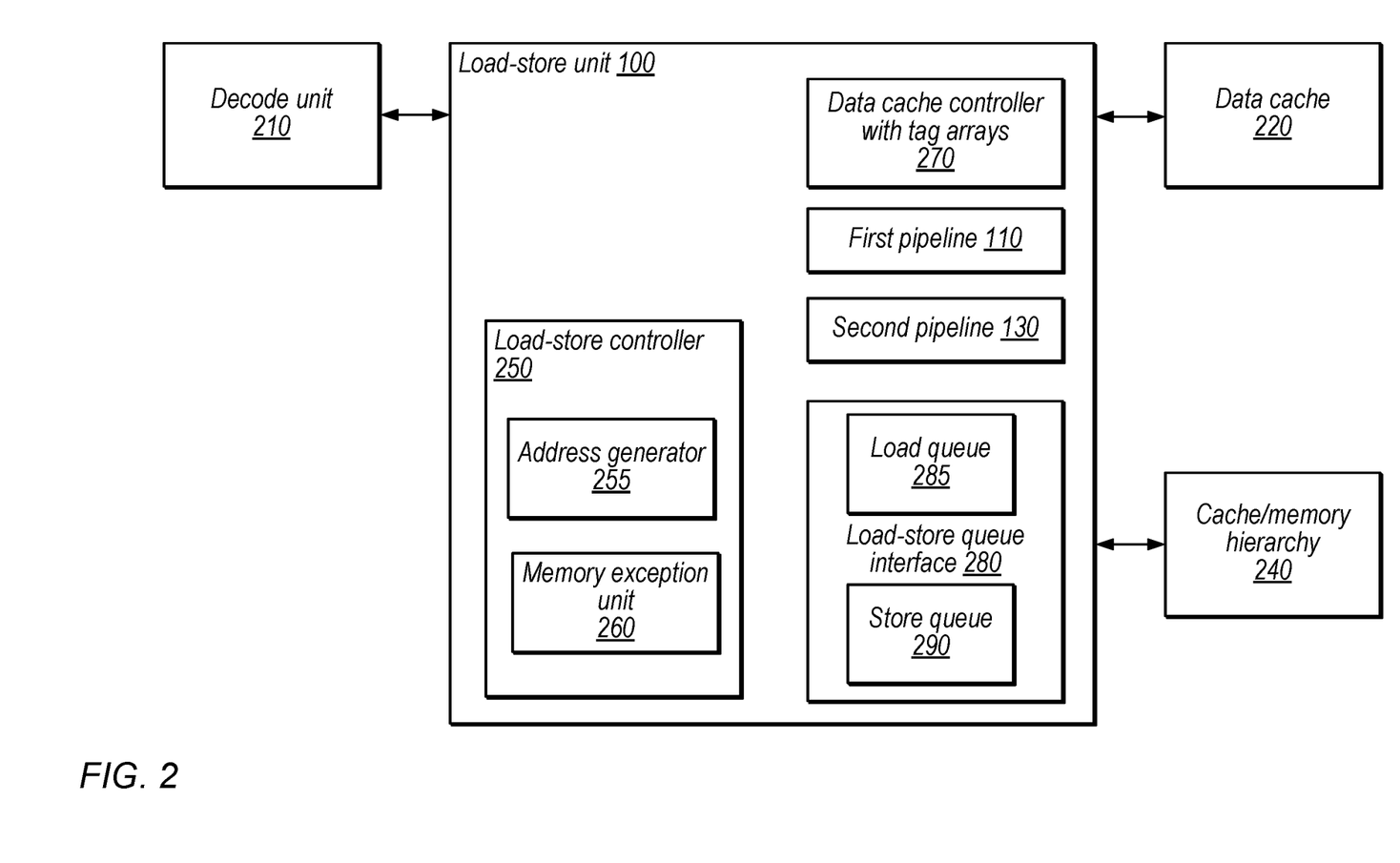
FIG. 2 is a block diagram illustrating example circuitry of a load-store unit, according to some embodiments.

FIG. 2 is a block diagram illustrating example circuitry of, and connections to, a load-store unit, according to some embodiments. In the illustrated embodiment, load-store unit 100 includes load-store controller 250, data cache controller with tag arrays 270, load-store queue interface 280, first pipeline 110, and second pipeline 130. Load-store controller 250, in turn, includes address generator 255 and memory exception unit 260. Load-store queue interface 280, in turn, includes load queue 285 and store queue 290. In the illustrated embodiment, load-store unit 100 also communicates with other circuitry, including decode unit 210, data cache 220, and cache/memory hierarchy 240. In some embodiments, load-store unit 100 is included in a pipeline that includes fetch and align stages in addition to the decode stage corresponding to decode unit 210. The first and second pipelines 110 and 130 may implement various additional stages for memory access instructions. Other execution units may implement additional stages for other types of instructions.

In the illustrated embodiment, load-store unit 100 is configured to perform loads from and stores to data cache 220, as well as cache/memory hierarchy 240. In some embodiments, data cache 220 is an L1 cache and cache/memory hierarchy may include an L2 cache, an L3 cache, system memory, etc. Different levels in the hierarchy may be private or shared and may be dedicated (e.g., to instructions or data) or be unified.

In some embodiments, data cache 220 is a data storage configured to store a subset of frequently accessed data. Data cache 220, in some embodiments, may use a write-through or a write-back cache writing policy.

In some embodiments, data cache 220 is a write-through data cache in which data is simultaneously written to a lower-level storage (e.g., backing storage, memory, etc.) whenever data is written to data cache 220.

In some embodiments, data cache 220 is a write-back data cache in which data is written to the data cache only and written to a lower-level storage (e.g., backing storage, memory, etc.) when the data is removed from data cache 220.

In the illustrated embodiment, cache/memory hierarchy 240 is another cache level of the computing system. For example, cache/memory hierarchy 240 may be a private level-2 cache.

In the illustrated embodiment, decode unit 210 is configured to issue instructions to load-store unit 100 for loads and stores. Decode unit 210 also may send offsets used for address calculation by load-store unit 100, and more particularly address generator 255.

In some embodiments, load-store unit 100 returns a load result to decode unit 210 which is written to a general-purpose register on a load commit. Load-store unit 100 also returns non-blocking load information to decode unit 210, which may maintain a content-addressable memory for source-destination dependency checks.

Load-store controller 250, in some embodiments, provides instructions to the correct pipelines, e.g., based on decoding. In some embodiments, load-store controller 250 is also configured to align load data before such information is transmitted for general-purpose register updates.

Address generator 255, in the illustrated embodiment, generates load/store instruction addresses, e.g., using relevant operands and immediate values of an instruction. In some embodiments, address generator 255 may calculate the load/store instruction address based on information received from a register and an immediate value, a first register and a second register, a direct address operand, etc.

Memory exception unit 260, in the illustrated embodiment, is configured to detect memory exceptions.

In the illustrated embodiment, data cache controller with tag arrays 270 is configured to interface with and manage data cache 220 and the first and second tag arrays. In some embodiments, data cache controller with tag arrays 270 forms addresses and enables per bank that are sent to the data cache 220.

In some embodiments, if a load does not hit to data cache 220 or the load-store unit 100 is unable to provide all the bytes requested by the load, the load may proceed to cache/memory hierarchy 240. In some embodiments, in which data cache 220 is a write-through data cache, all stores bypass data cache 220 and are sent to cache/memory hierarchy 240.

In some embodiments, uncacheable load or store instructions bypass data cache 220 (and potentially one or more other cache levels in cache/memory hierarchy 240, e.g., by going directly to a bus interface unit).

In the illustrated embodiment, load-store queue interface 280 includes load queue 285 and store queue 290. In some embodiments, load-store queue interface 280 uses a multiplexor circuit to select between potential sources of data for a load. For example, sources of data for a load may include in-pipe read-after-write (RAW) hazard forwarding, store queue RAW forwarding, data cache 220, etc.

In the illustrated embodiment, load queue 285 stores load instructions before they are sent to cache/memory hierarchy 240. In some embodiments, such loads may be considered to be non-blocking loads. In some embodiments, load instructions are written to the load queue 285 pre-commit. Load instructions may be deallocated from the load queue after a response is received from cache/memory hierarchy 240 confirming a load has been performed.

In the illustrated embodiment, store queue 290 is a post-commit queue for store instructions to reside before being performed to write to cache/memory hierarchy 240. Store instructions are deallocated from the store queue after a response is received from cache/memory hierarchy 240 confirming a store has been performed.

In some embodiments, younger load operations forward data from older store operations that include overlapping bytes from the store queue. Additionally, younger store operations to the same double-word may coalesce with any older store operations to the same double-word upon commit.

In some embodiments, load operations issued to cache/memory hierarchy 240 have priority over store operations and store operations are sent to cache/memory hierarchy 240 opportunistically.

In the illustrated embodiment, load-store unit 100 includes first pipeline 110 and second pipeline 130. In some embodiments, first pipeline 110 may be configured to service load instructions, store instructions, atomic operations, etc., using a first tag array and second pipeline 130 may be configured to service fills, probes, store-updates, etc., using a second tag array. In other embodiments, load and store instructions may be serviced by separate load and store pipelines.

In some embodiments, in a first stage of the load pipeline, address generator 255 may use a register value and an immediate value to form an address used to access the data that is to be loaded and that may be used to generate various memory exceptions. In other embodiments, address generator 255 may use multiple register values and multiple immediate values to form the address. In some embodiments, the address may be generated using a load result of another instruction from a later stage of the load pipeline in addition to an immediate value.

In some embodiments, in a second stage of the load pipeline, data cache 220 is accessed by the load. One or more tag arrays are read in order to retrieve the tag status for the corresponding load. In the case of a load miss, a fill way is allocated for the load miss and the corresponding entry in the tag array is invalidated in a later stage of the load pipeline. In some embodiments, if an atomic load operation hits data cache 220, the corresponding tag entry is invalidated in a later stage of the load pipeline. If the load misses data cache 220 or is unable to provide all the bytes required by the load, it is written to load queue 285 in the second stage of the load pipeline. In some embodiments, read-after-write (RAW) forwarding matches are detected between loads in this stage and stores in later stages of the load pipeline.

In some embodiments, in a later stage of the load pipeline, memory access operations are actually performed, e.g., where data is retrieved from a cache or memory and loaded into a register.

In some embodiments, in a later stage of the load pipeline, commit operations are performed where an instruction exits the load pipeline and commits its result to the architectural state of the system.

Referring now to the store pipeline, in some embodiments, in a first stage of the store pipeline, address generator 255 may use a register value and an immediate value to form an address in which data is to be stored and that may be used to generate various memory exceptions, in a similar manner as the load pipeline. In other embodiments, address generator 255 may use multiple register values and multiple immediate values to form the address. In some embodiments, the address may be generated using a load result of another instruction from a later stage of a load pipeline in addition to an immediate value. Store data is provided for in register contents.

In some embodiments, in a later stage of the store pipeline, memory access operations are performed where data is stored in memory.

In some embodiments, in a later stage of the store pipeline, stores commit and the state of the system is irrevocably modified. In this stage of the store pipeline, if no flushes occur for the respective store, the respective store is written to store queue 290.

Example Data Tag Replay and Pipeline Priority Control

Figure 3:
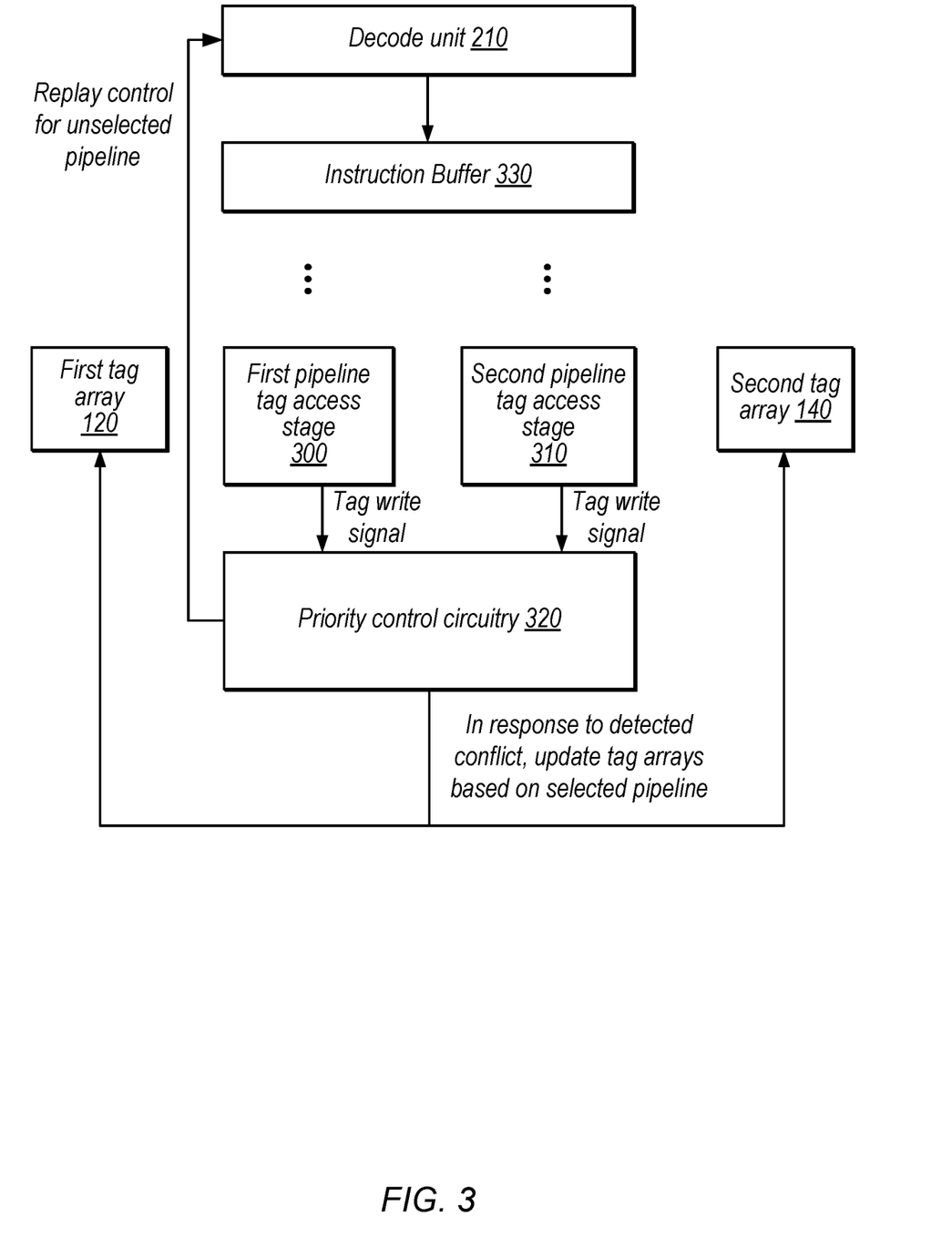
FIG. 3 is a block diagram illustrating example arbitration among pipelines, according to some embodiments.

FIG. 3 is a block diagram illustrating example arbitration among pipelines, according to some embodiments. Elements in the illustrated embodiment include decode unit 210, instruction buffer 330, first pipeline tag access stage 300, second pipeline tag access stage 310, priority control circuitry 320, first tag array 120, and second tag array 140.

Generally, the discussion below focuses on a case where stages 300 and 310 both desire to write to a tag array in the same cycle. Priority control circuitry 320 is configured to select one of the pipelines, in this scenario, and issue a replay signal to replay instruction(s) from the losing pipeline.

In the illustrated embodiment, decode unit 210 is configured to store instructions in instruction buffer 330.

In the illustrated embodiment, first pipeline tag access stage 300 is configured to service memory operations from the first pipeline that require access to tag array contents. Similarly, second pipeline tag access stage 310 is configured to service memory operations from the second pipeline that require access to tag array contents. In some embodiments, the memory operations in second pipeline tag access stage 310 are fills, probes, and store-updates.

In the illustrated embodiment, priority control circuitry 320 arbitrates between first pipeline tag access stage 300 and second pipeline tag access stage 310 when they both assert a tag write signal. In some embodiments, in response to a detected conflict between write operations of first pipeline tag access stage 300 and write operations of second pipeline tag access stage 310, first tag array 120 and second tag array 140 are updated based on the selected pipeline indicated by priority control circuitry 320. First tag array 120 and second tag array 140 may be updated with the same data simultaneously, to ensure identical information is reflected. In some embodiments, the load-store unit is configured to allow at most one of the first and second pipelines to write to the first tag array 120 and second tag array 140 in a given cycle.

In some embodiments, decode unit 210 receives a request to replay control for a particular pipeline indicated by priority control circuitry 320 and initiates a replay of instructions from the pipeline that loses arbitration.

In some embodiments, second pipeline tag access stage 310 has priority over first pipeline tag access stage 300. In these embodiments, conflicts at stages 300 and 310 are always resolved in favor of stage 310. In this scenario, decode unit 210 may replay the instruction in stage 300 and all younger instructions in the pipeline to instruction buffer 330. In some embodiments, decode unit 210 replays only instructions that are younger than the oldest dependent instruction. For example, the pipeline may maintain sufficient instruction data to compare the destination of the load that loses arbitration for the tag arrays with all consumers in the pipeline (e.g., starting backwards from the oldest) and flushing from the point at which the first dependency is found. This may improve performance by avoiding flushing of instructions that do not actually depend on the load being replayed.

In other embodiments, first pipeline tag access stage 300 has priority over second pipeline tag access stage 310. In some embodiments, priority among pipelines may vary, e.g., based on current operating conditions.

In other embodiments, similar arbitration techniques may be achieved via a single tag memory array that has dual read port and single write port capabilities.

Example Secondary Miss Replay

Figure 4:
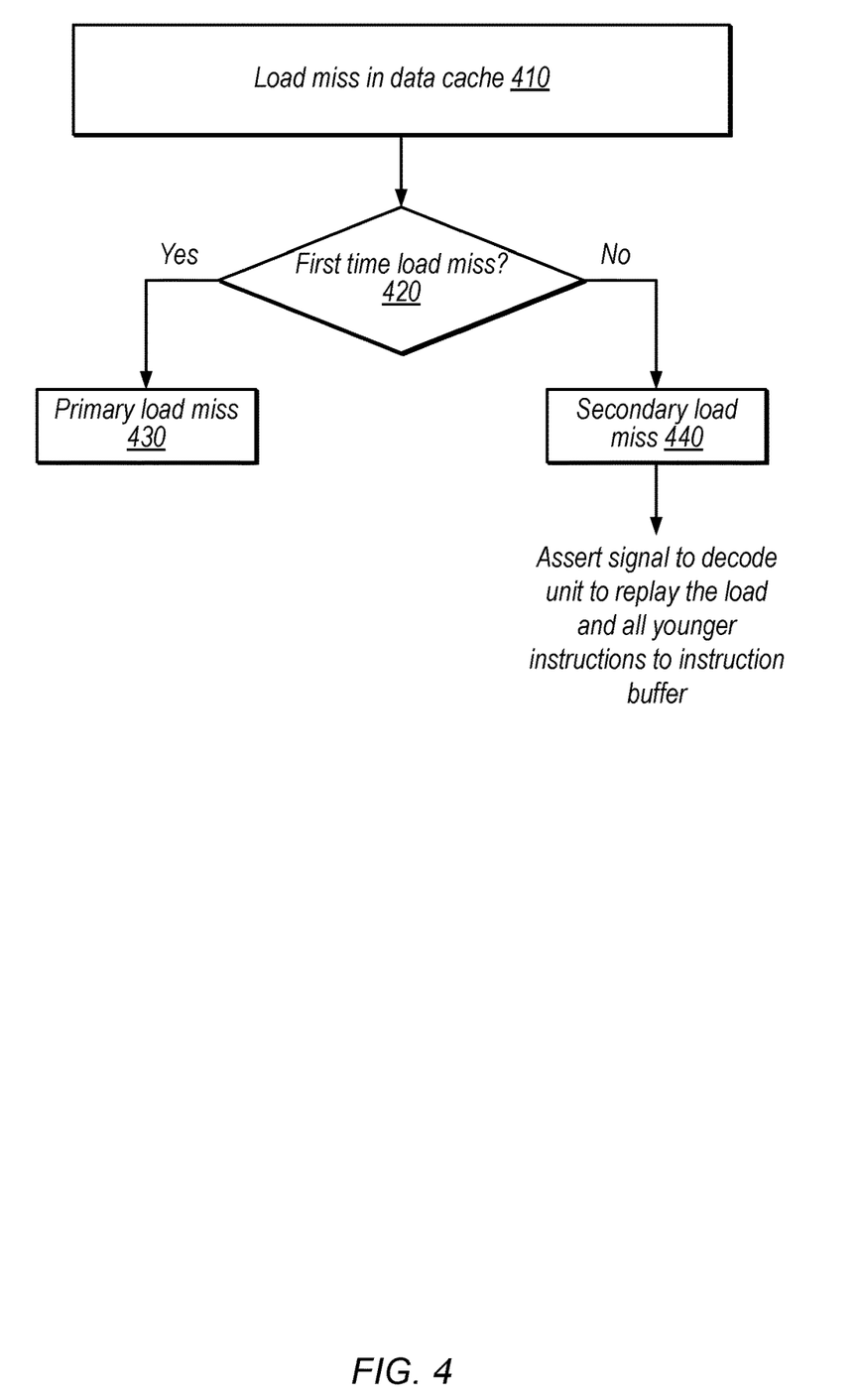
FIG. 4 is a block diagram illustrating an example data cache secondary miss replay, according to some embodiments.
Figure 5:
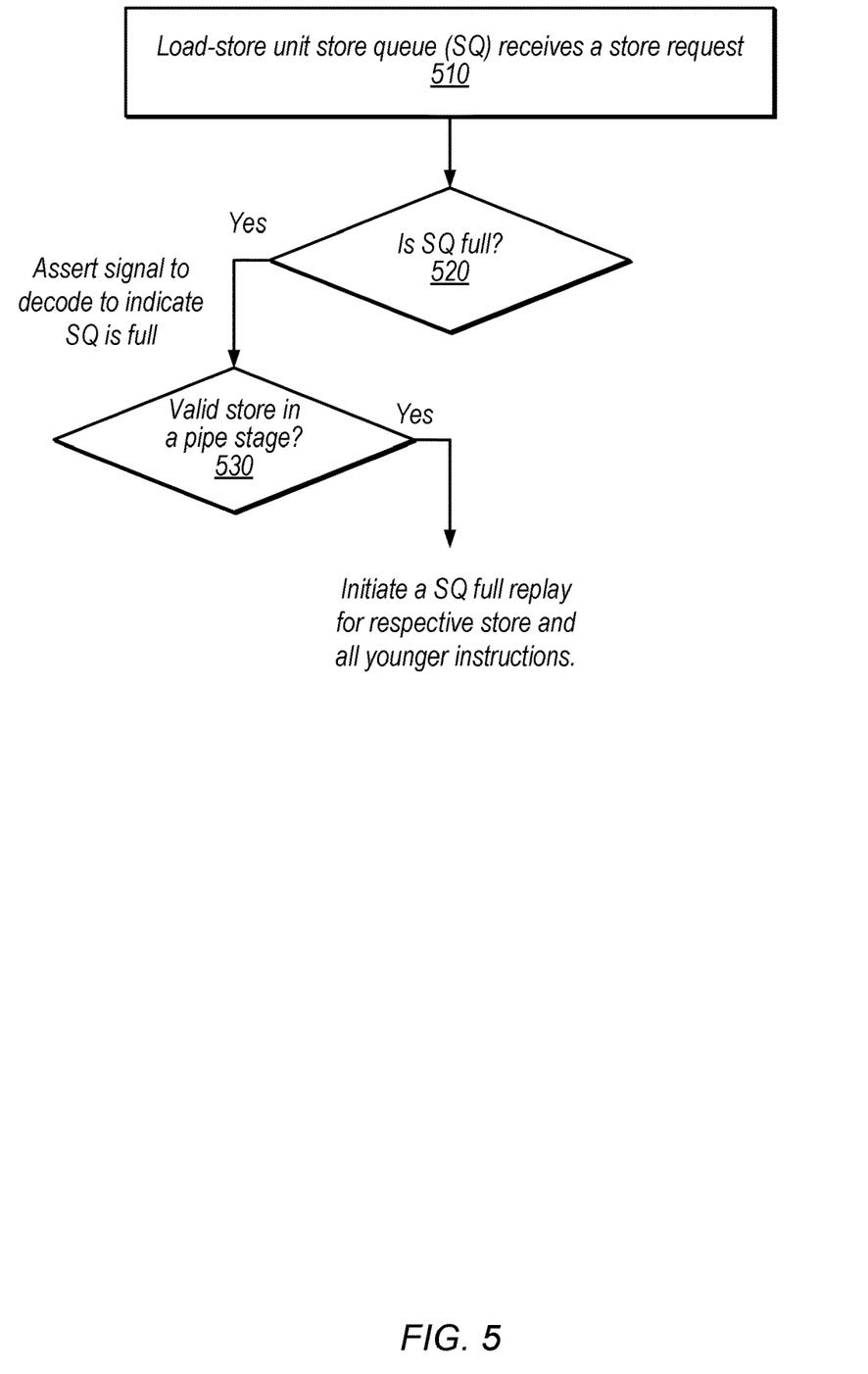
FIG. 5 is a block diagram illustrating an example data cache store queue replay, according to some embodiments.
Figure 6:
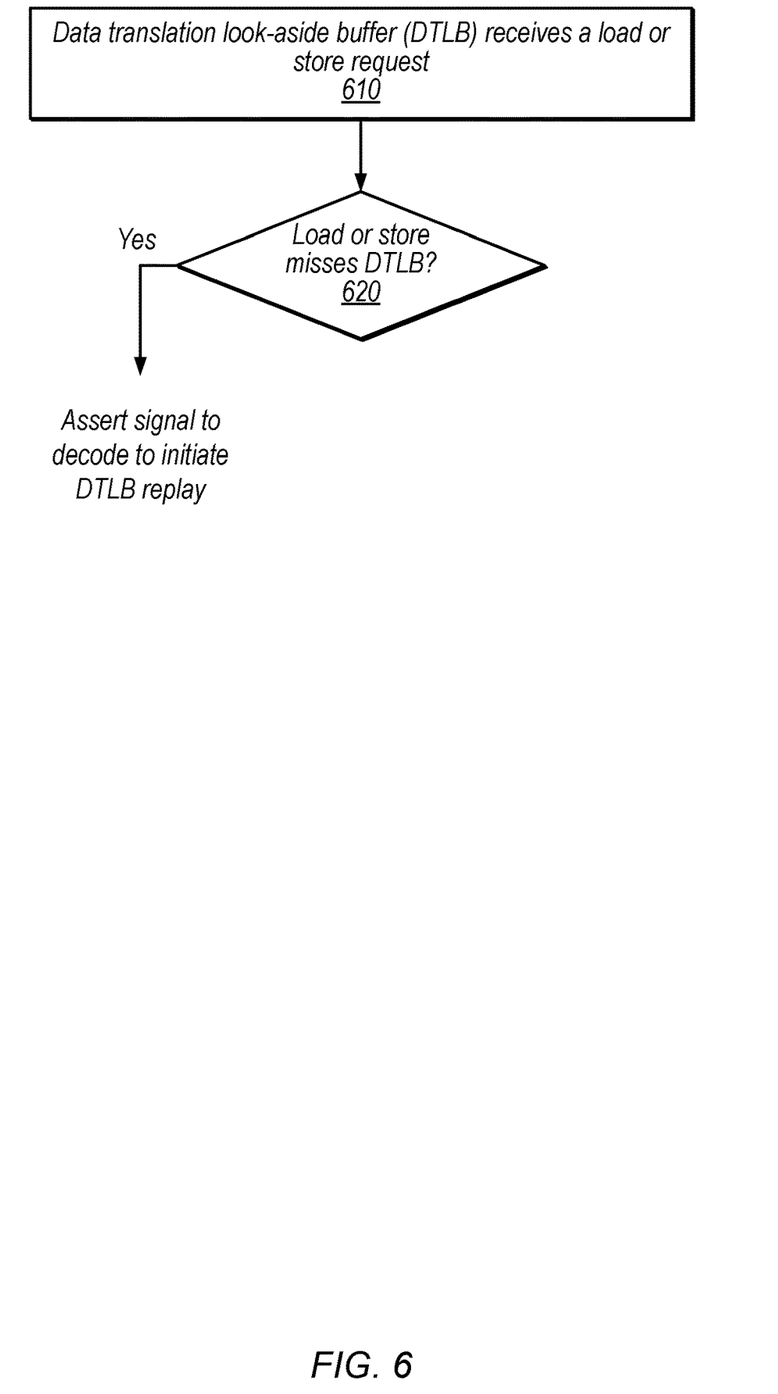
FIG. 6 is a block diagram illustrating an example data cache data translation look-aside buffer (DTLB) replay, according to some embodiments.

In some embodiments, in addition to replays based on tag array conflicts, the system supports various additional replays. FIGS. 4-6 provide non-limiting examples of techniques for performing different types of replays.

FIG. 4 is a block diagram illustrating an example data cache secondary miss replay, according to some embodiments. At 410, in the illustrated embodiment, a load instruction miss occurs in a data cache. In some embodiments, the load instruction miss may occur because the requested data is not currently in the data cache or because of some other reason. For example, the data may have never been in the data cache, the data may have been evicted from the data cache by either the caching system or an external application that makes an eviction request, some of the bytes in the load may not have been fully satisfied by a data cache hit or RAW forwarding, etc.

At 420, in the illustrated embodiment, a determination is made whether the load instruction miss is a first-time load instruction miss. If the load instruction miss occurs for the first time, flow proceeds to 430. Otherwise, if the load instruction miss has occurred before, flow proceeds to 440.

At 430, in the illustrated embodiment, a determination is made that this is the first occurrence of the load instruction miss, also known as a primary load miss. A primary load miss is added to a load queue for future execution. Note that loads may be given higher priority than stores and stores may be executed opportunistically.

At 440, in the illustrated embodiment, a determination is made that this not the first occurrence of the load instruction miss. For example, control circuitry may determine that the load instruction missed in the data cache but hit to an outstanding load miss in the load queue. Such a miss is referred to as a secondary load miss.

In some embodiments, in response to detecting a secondary load miss, a signal is asserted to a decode unit to replay the corresponding load miss and all younger instructions to an instruction buffer. In some embodiments, the cycle after a replay is performed, the replayed instructions are stalled until the next fill operation has completed. This may increase the likelihood that data is available for the load, e.g., based on the fact that there is a substantial possibility that the fill operation populated the load data to the data cache.

In some embodiments, no address matching is performed between a secondary load miss and fill addresses that may be present in a secondary pipeline of a load-store unit. In these embodiments, the secondary load miss may simply be stalled until the next fill is completed. In other embodiments, control circuitry may determine whether the secondary load miss depends on data that will be provided by one or more initiated fill operations, and may determine whether to stall the secondary load miss based on this determination.

Example Store Queue Replay

FIG. 5 is a block diagram illustrating an example data cache store queue replay, according to some embodiments. At 510, in the illustrated embodiment, a load-store unit store queue receives a store instruction for store pipelining from the load-store unit to the cache/memory hierarchy. Allocating store queue entries as late as possible in the pipeline may allow use of a smaller store queue to preserve power and to limit area considerations. Further, allocating store queue entries as late as possible in the pipeline may avoid store queue full conditions, which may introduce stalls and cause negative performance effects.

At 520, in the illustrated embodiment, a determination is made whether the store queue is full. If the store queue is full, a signal is asserted to a decode unit to indicate the store queue is full, and flow proceeds to 530. Otherwise, the store may be added to the store queue.

At 530, in the illustrated embodiment, a determination is made by a decode unit whether a valid store exists in a pipeline stage. In response to the decode unit determining a valid store exists in a pipeline stage, a store queue full replay is initiated for the corresponding store and all younger instructions.

In some embodiments, the corresponding store is eligible for decode the cycle after the store queue full replay is initiated by the decode unit. In other embodiments, the corresponding store is eligible for decode the cycle in which one or more entries in the store queue deallocate.

Example Data Translation Look-Aside Buffer Replay

FIG. 6 is a block diagram illustrating an example data cache data translation look-aside buffer replay, according to some embodiments. At 610, in the illustrated embodiment, a data translation look-aside buffer (DTLB) receives a request to service a load or store instruction.

At 620, in the illustrated embodiment, a determination is made whether the load or store instruction misses the DTLB. If the load or store instruction misses the DTLB, a signal is asserted to a decode unit to initiate a DTLB replay of the load or store request and younger instructions in the pipeline, e.g., all younger instructions or a subset of instructions based on dependency checking. A DTLB miss stall may also be asserted in the decode unit until a TLB miss response is received from a memory management unit (MMU). Otherwise, the load or store request may be executed normally.

Example Methods

Figure 7:
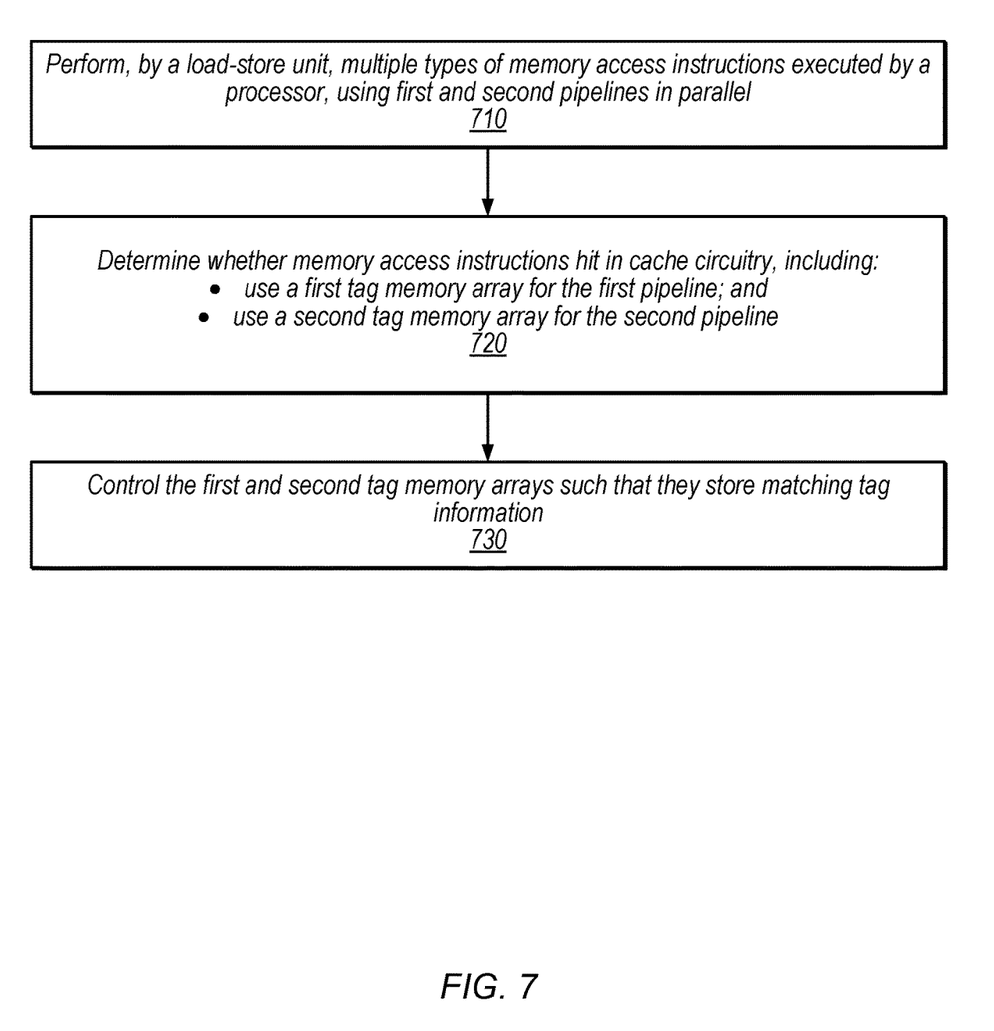
FIG. 7 is a flow diagram illustrating an example method for performing multiple types of memory access instructions in a dual pipeline dual tag array of a load-store unit, according to some embodiments.

FIG. 7 is a flow diagram illustrating an example method for performing multiple types of memory access instructions in a dual pipeline dual tag array of a load-store unit, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, load store unit performs multiple types of memory access instructions that are executed by a processor, using first and second pipelines in parallel. In some embodiments, the first pipeline is configured to service various operations including load instructions, store instructions, atomic operations, etc., using a first tag array, whereas the second pipeline is configured to service various other operations including fills, probes, store-updates, etc., using a second tag array.

In some embodiments, the first and second tag arrays are identical copies of the same information and remain consistent at all times. In such embodiments, the first tag array may be used for data cache instruction accesses, such as those mentioned above, for a data cache, while the second tag array may be used to service any number of operations, such as those mentioned above, for a level-2 cache or memory hierarchy.

At 720, in the illustrated embodiment, a determination is made whether the memory access instructions hit in cache circuitry (e.g., whether address information of memory access instructions matches tag data for the cache). In the illustrated embodiment, a first tag memory array for the first pipeline and a second tag memory for the second pipeline are used to determine hits and misses.

In some embodiments, the first tag memory array is the tag memory array corresponding to the first pipeline which is configured to service load instructions, store instructions, atomic operations, etc.

In some embodiments, the second tag memory array is the tag memory array corresponding to the second pipeline which is configured to service fills, probes, store-updates, etc.

In some embodiments, arbitration of the first and second pipelines is carried out using priority control circuitry when a tag write conflict scenario occurs. In some embodiments and in such scenarios, the secondary pipeline takes priority and the first pipeline operation and all younger operations are replayed to a decode unit and subsequently to an instruction buffer.

At 730, in the illustrated embodiment, the first and second tag memory arrays are controlled such that they store matching tag information. Various restrictions may be implemented to ensure tag information matches in both the first and second tag memory arrays. For example, the load-store unit is configured to allow at most one of the first and second pipeline to write to the tag memory arrays in any given cycle, in some embodiments. As another example, the load-store unit may be configured to write a same value to both the first and second tag memory arrays in response to either one of the first and second pipelines writing a tag.

In some embodiments, a data cache tag replay is initiated when a tag write conflict occurs between the first and second pipelines. In such scenarios, the secondary pipeline is chosen to take priority over the first pipeline by priority control circuitry, such that the first pipeline's current operation and all younger operations are replayed.

In some embodiments, a data cache secondary miss replay is initiated. A data cache secondary miss replay occurs when a load instruction subsequently misses the data cache and hits to previous outstanding load misses in the load queue. In such scenarios, a signal is asserted to a decode unit to indicate a secondary miss has occurred and to initiate a replay of the corresponding load instruction as well as all younger instructions to an instruction buffer.

In some embodiments, the load-store unit may further include control circuitry that detects a secondary miss and a fill on which the secondary miss depends. Under the circumstances in which a secondary miss and a fill on which the secondary miss depends is detected, the secondary miss may be stalled until the fill is serviced. Upon a successful fill, the secondary miss may be released into a pipeline.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
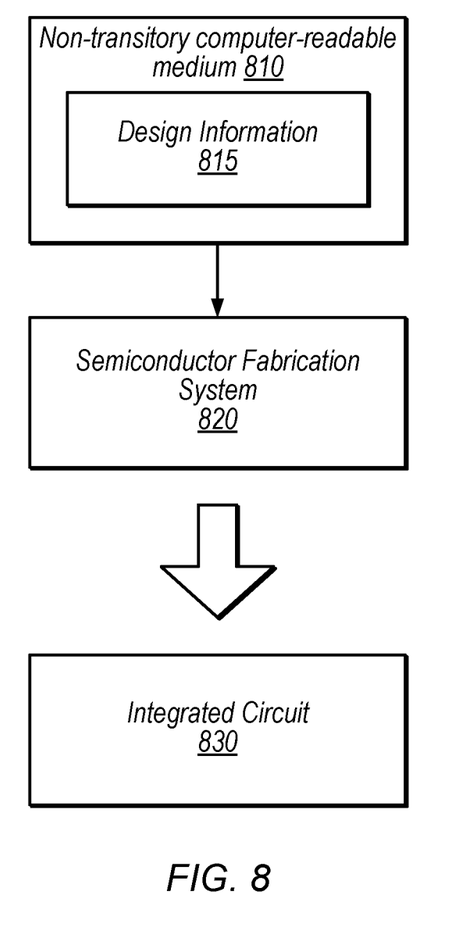
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-3. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however, After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices flip-flops, registers, latches, etc.), finite state machines, memory random-access memory, embedded dynamic random-access memory), programmable logic arrays, and so on, Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a processor configured to execute program instructions;
   cache circuitry; and
   a load-store unit configured to:
   perform multiple types of memory access instructions executed by the processor, using first and second pipelines in parallel;
   determine whether memory access instructions hit in the cache circuitry, including to:
   use a first tag memory array for the first pipeline; and
   use a second tag memory array for the second pipeline; and
   control the first and second tag memory arrays such that they store matching tag information, wherein the load-store unit further comprises control circuitry, configured to replay one or more instructions of a pipeline that loses an arbitration, and wherein the control circuitry is further configured to determine an oldest dependent instruction and to replay the corresponding instruction as well as all instructions younger than and including the oldest dependent instruction of the first pipeline.

2. The apparatus of claim 1, wherein the second pipeline takes priority over the first pipeline and the control circuitry is further configured to replay a corresponding instruction as well as all younger instructions of the first pipeline.

3. The apparatus of claim 1, wherein the second pipeline takes priority over the first pipeline.

4. The apparatus of claim 1, wherein the load-store unit is configured to allow at most one of the first and second pipelines to write to the first and second tag memory arrays in a given cycle.

5. The apparatus of claim 1, wherein to control the first and second tag memory arrays, the load-store unit is configured to write a same value to both the first and second tag memory arrays in response to either one of the first and second pipelines writing a tag.

6. The apparatus of claim 1, wherein the multiple types of memory access instructions include:
   a first subset of memory access types that the first pipeline is configured to perform; and
   a second subset of memory access types that the second pipeline is configured to perform.

7. The apparatus of claim 6, wherein the first subset of memory access types includes the following types that are not included in the second subset: load instructions, store instructions, and atomic operations.

8. The apparatus of claim 6, wherein the second subset of memory access types includes the following types that are not included in the first subset: fills, probes, and store-updates.

9. A method, comprising:
   performing, by a load-store unit of a processor, multiple types of memory access instructions executed by a processor, using first and second pipelines in parallel;
   determining, by the load-store unit, whether memory access instructions hit in cache circuitry, including:
   using a first tag memory array for the first pipeline; and
   using a second tag memory array for the second pipeline;
   controlling the first and second tag memory arrays such that they store matching tag information;
   arbitrating, by control circuitry, between the first and second pipelines in response to an attempt for the first and second pipeline to write to the first and second tag memory arrays in a given cycle; and
   replaying one or more instructions of a pipeline that loses an arbitration, wherein the control circuitry is further configured to determine an oldest dependent instruction and to replay the corresponding instruction as well as all instructions younger than and including the oldest dependent instruction of the first pipeline.

10. The method of claim 9, further comprising:
    wherein the first pipeline always loses arbitration if both the first and second pipelines attempt to write the first and second tag memory arrays in a given cycle.

11. The method of claim 9, further comprising:
    allowing at most one of the first and second pipelines to write to the first and second tag memory arrays in a given cycle.

12. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes
    a processor configured to execute program instructions;
    cache circuitry; and
    a load-store unit configured to:
    perform multiple types of memory access instructions executed by the processor, using first and second pipelines in parallel;
    determine whether memory access instructions hit in the cache circuitry, including to:
    use a first tag memory array for the first pipeline; and
    use a second tag memory array for the second pipeline;
    control the first and second tag memory arrays such that they store matching tag information, wherein the load-store unit further comprises control circuitry configured to arbitrate between the first and second pipelines in response to an attempt for the first and second pipelines to both write to the tag memory arrays in a given cycle; and
    replay one or more instructions of a pipeline that loses an arbitration, and wherein the control circuitry is further configured to determine an oldest dependent instruction and to replay the corresponding instruction as well as all instructions younger than and including the oldest dependent instruction of the first pipeline.

* * * * *